INVENTOR.
WILLIAM G. GELB
ATTORNEY

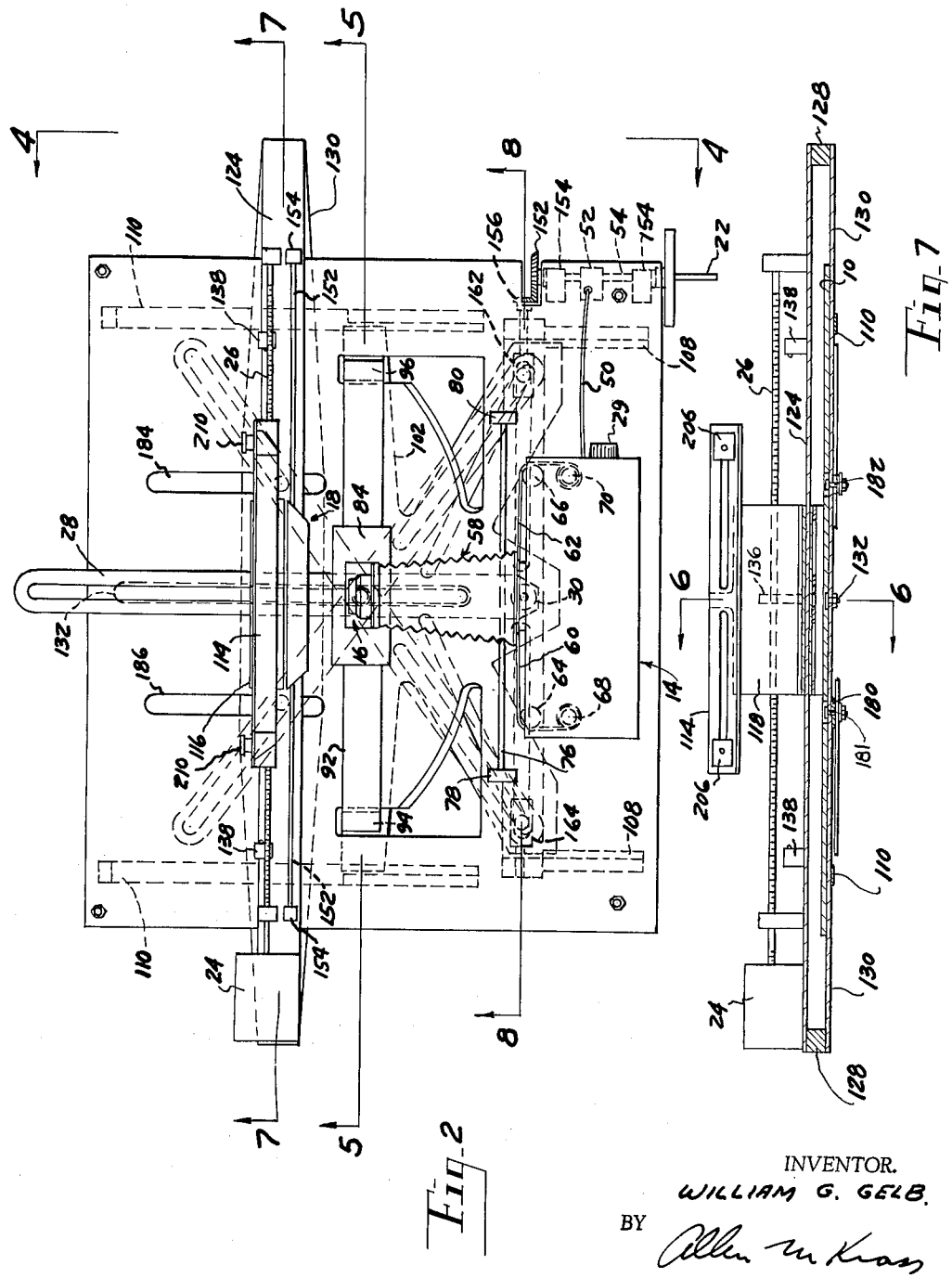

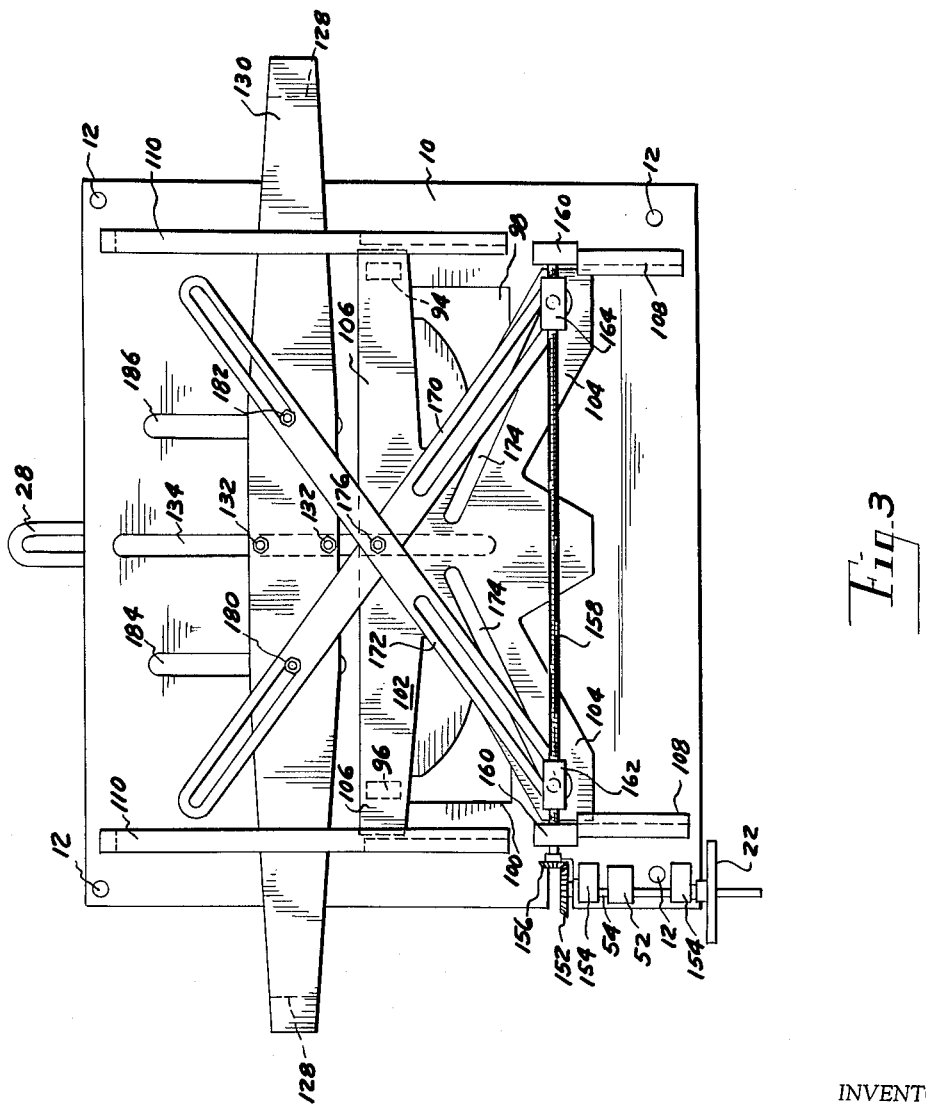

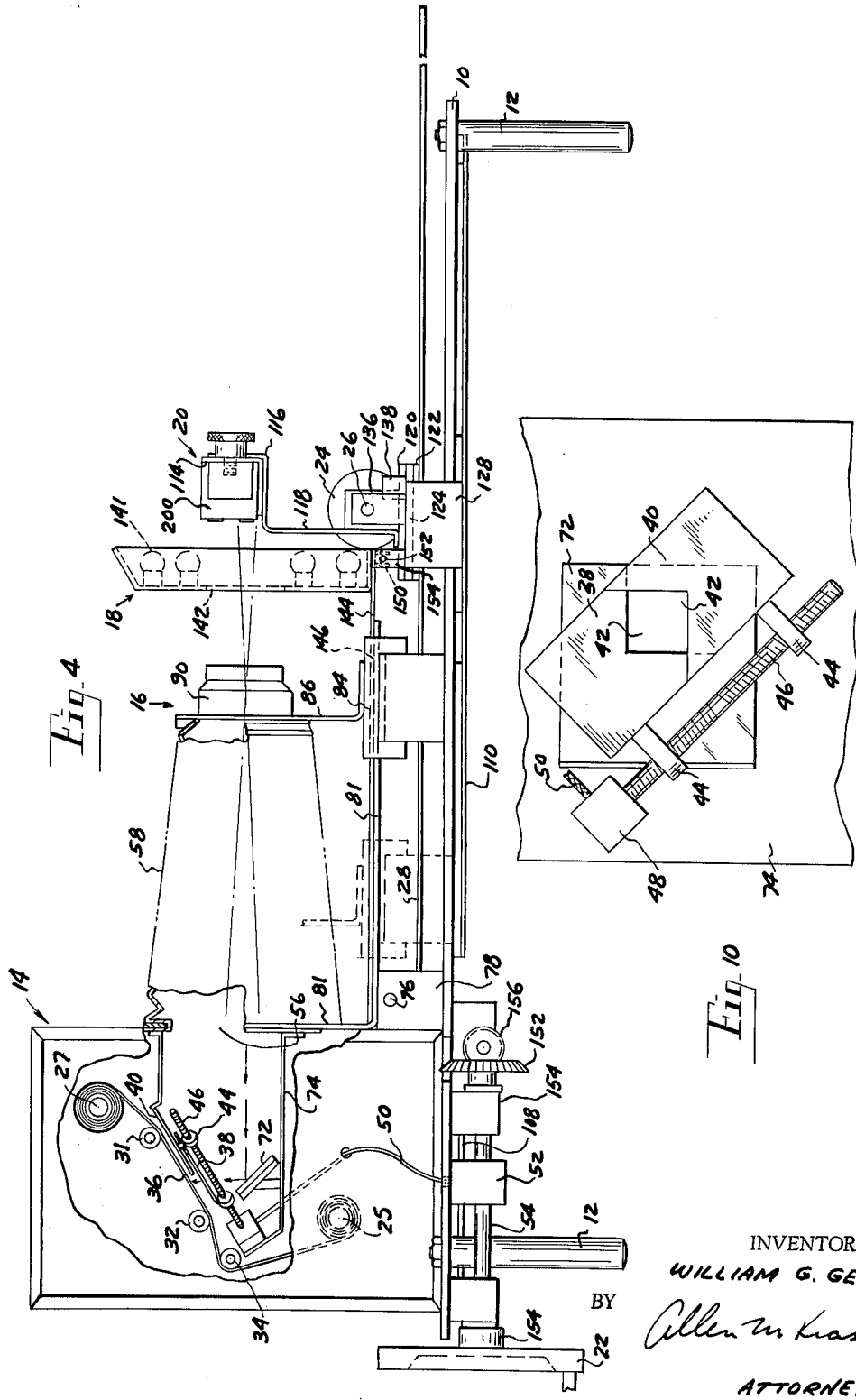

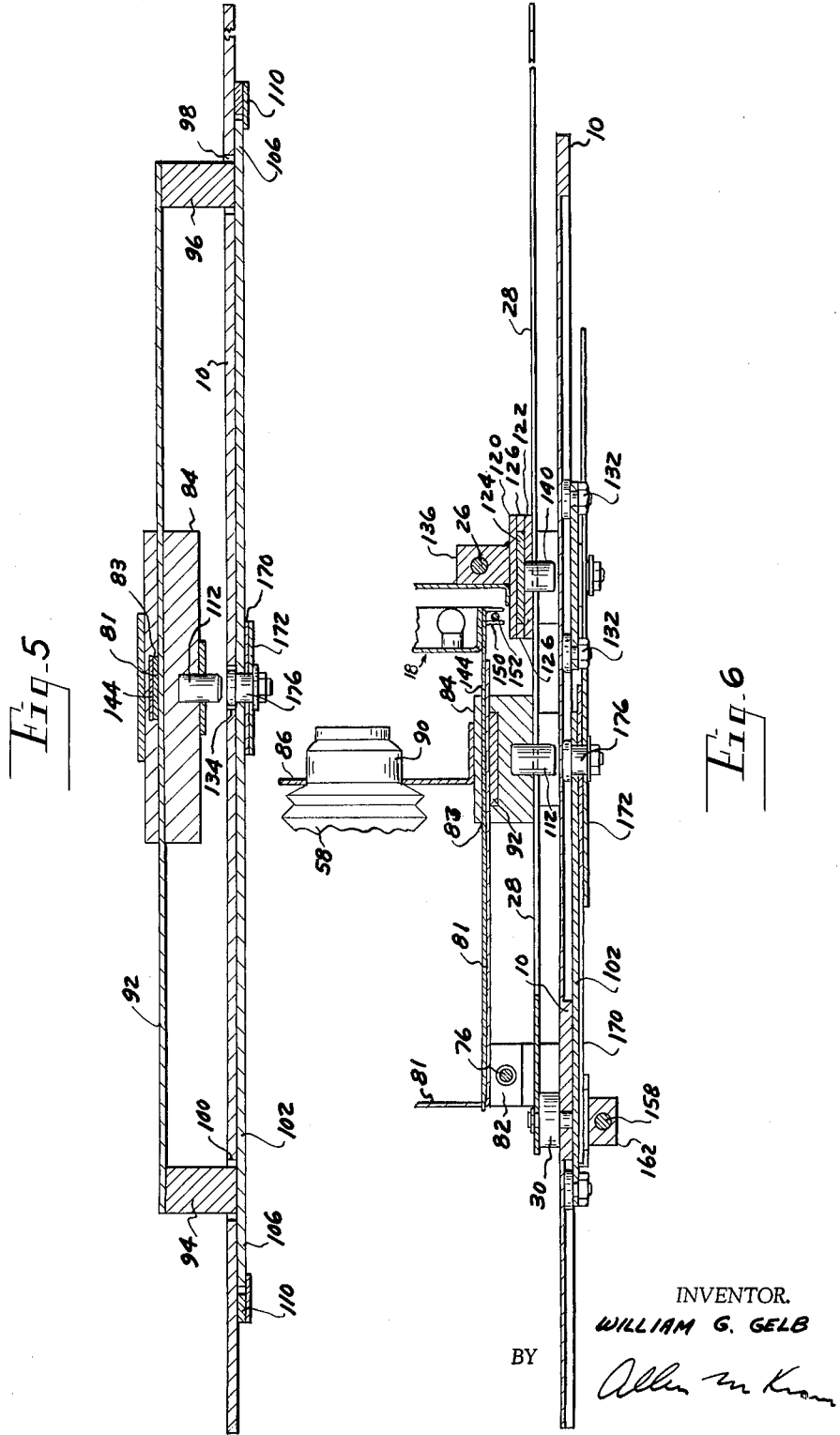

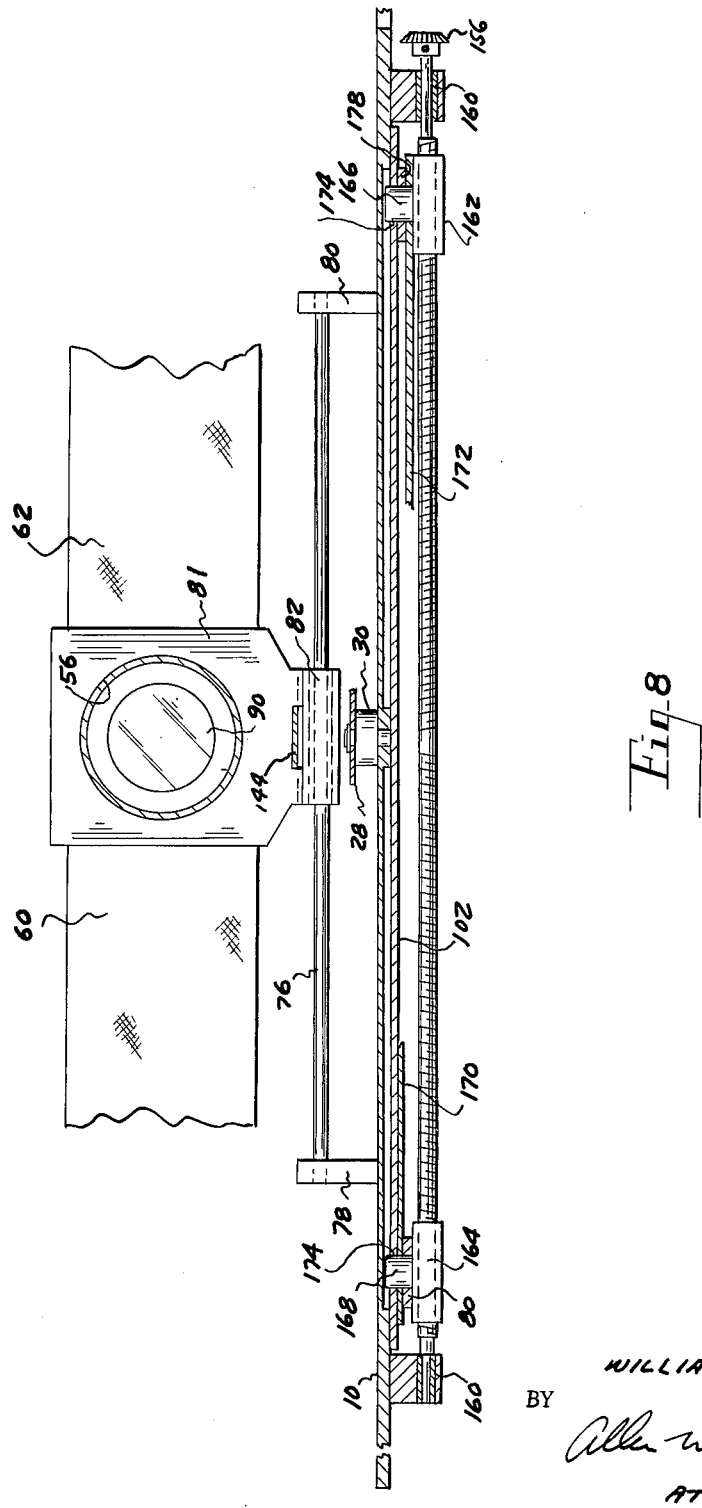

Dec. 14, 1965 W. G. GELB 3,222,982
SCANNING PHOTOGRAPHIC COPYING APPARATUS
Filed Dec. 13, 1961 8 Sheets-Sheet 7
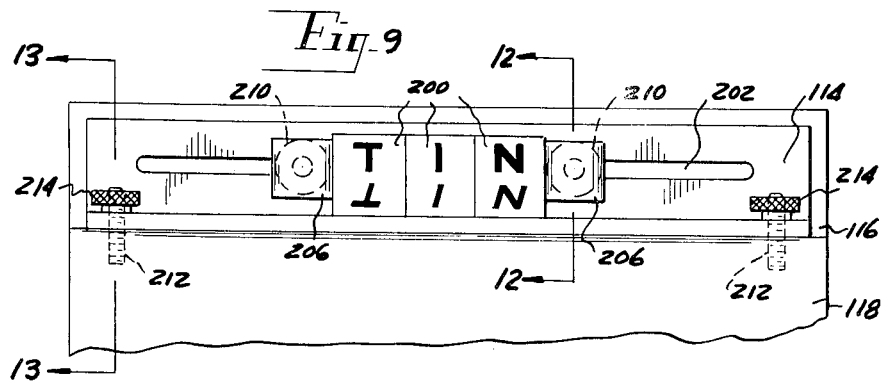
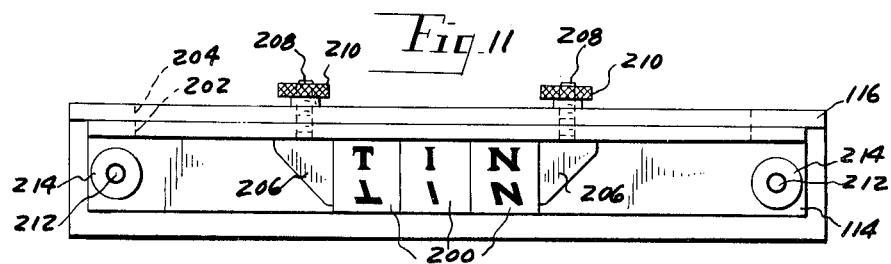
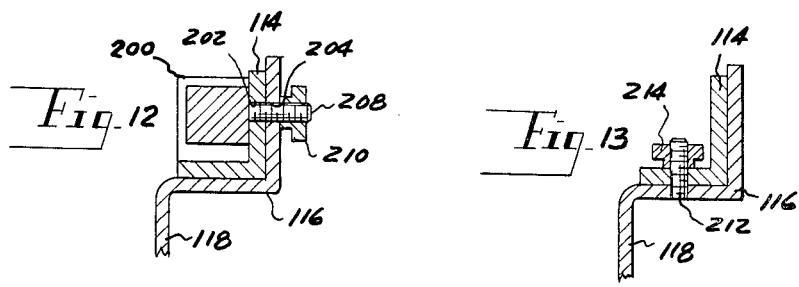
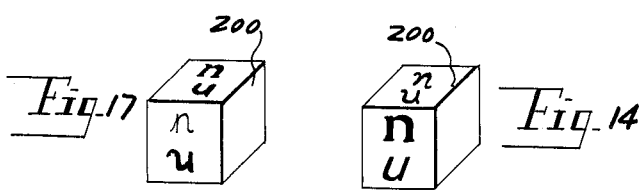
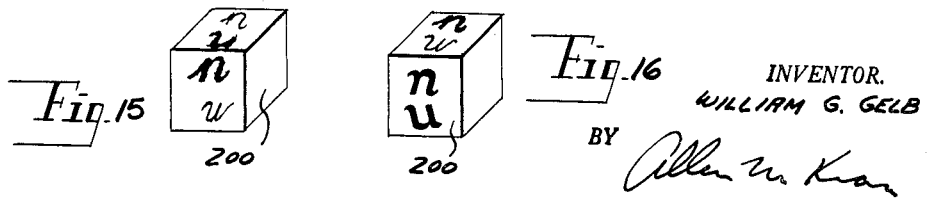
INVENTOR.
WILLIAM G. GELB
BY
ATTORNEY United States Patent Office 3,222,982
Patented Dec. 14, 1965

3,222,982
SCANNING PHOTOGRAPHIC COPYING
APPARATUS
William G. Gelb, 13517 Vassar Drive, Detroit, Mich.
Filed Dec. 13, 1961, Ser. No. 159,003
5 Claims. (Cl. 88—24)

This invention relates to a machine for photographically producing a composed sheet of type characters from individual type pieces, and to a special form of type which may be used in such a machine.

In preparing material for use with lithographic reproduction techniques such as the offset process, it is convenient to assemble type into single lines of copy and to sequentially photograph successive copy lines on a single film sheet in order to prepare an entire type set sheet or portions thereof. The type used in such operations is not raised but, rather, is graphically produced on a rectangular block and is manually set in a composing stick in a manner identical to that used with printing type.

Previous machines for practicing this process have employed a wide-angle lens capable of focusing an entire copy line on a wide film. Following the exposure of a single line, the film is indexed vertically in order to bring an unexposed portion into operative relation with the wide-angle lens.

The cost of these previous machines has been high because of the inherently expensive nature of the wide-angle lens and the shutter system used. It is, therefore, a principal object of the present invention to provide a photographic type composing machine which employs a low-cost, normal-angle lens and completely eliminates the use of a shutter system. These objects are achieved through use of a unique mechanical system for exposing a line of type to film by simultaneously scanning both the type and the film with a normal field lens.

A preferred embodiment of the present invention, which will subsequently be described in detail, employs an objective lens having a normal field supported between a composing stick support and a film holder. The film is of a width sufficient to reproduce the finished composed width.

The film is wound on horizontal rolls disposed above and below the lens plane and may be indexed vertically to bring successive unexposed sections into alignment with the lens. Both the objective lens and the copy support are movable across the width of the film. Mechanism is provided for moving both the lens and the film holder in timed relation to one another so that as the lens sweeps across the film width, the line of copy is moved across the lens plane. Both the objective lens and the copy holder may also be moved toward and away from one another and the film holder so as to provide various degrees of reduction or enlargement of the copy size. When the ratio of reduction or enlargement is adjusted, the mechanism that moves the lens and copy across the film must also be reset to provide an equivalent change in the width of reproduction of the copy. The present invention provides means for coupling these two motions so that the width adjustment is made automatically.

When the enlargement ratio is changed, the height of the strip of film which is exposed must be adjusted. And, in order to expose a film segment for a constant length of time, independent of the change in lens speed which occurs in the preferred embodiment when the enlargement ratio is changed, the width of the segment of film instantly exposed must be changed. An aperture adjustment mechanism powered from the same source as the enlargement ratio adjustment system is provided in the preferred embodiment.

The type used in forming a line of copy differs from printing type in that the image to be photographed is not raised but is rather marked on the block in the plane of the surface of the block. This opens the possibility of marking other characters on other surfaces of the block, and additionally marking more than one character on a given surface by providing each character with a unique disposition on that surface so that only the desired character will be photographically reproduced when the type block is disposed in the composing stick in a particular manner. The present invention, therefore, contemplates rectangular type blocks having two opposing faces formed as squares, and having two characters formed on each of the other four faces. Thus, each block contains eight characters arranged about four edges of a block having square sides. The present invention contemplates that all eight characters will represent the same letter, numeral, or mark in each of eight different type styles. Each of the eight styles of characters which appear on a given block will be designed so as to occupy the same width. The type system should therefore be used with eight type styles having the same width for each character. This system allows eight different type styles to be completely expressed in a single font of type.

In the preferred embodiment, the two characters on a given block face are arranged one above the other in such a manner that when a series of blocks are placed together in a composing stick with their square faces adjacent to one another in proper order the copy being set appears in two different type styles. The two characters in a single face are inverted with respect to one another so that the two versions of the copy which appear when the blocks are set in a composing stick are inverted with respect to one another. The machine of the present invention is arranged to only photograph one of the two copy versions. The inversion of the letters with respect to one another allows the blocks to be rotated through 90 or 180 degrees to bring other styles of the copy into position with respect to the machine.

It is, therefore, seen to be another object of the present invention to provide type blocks having a plurality of characters on each of four faces.

Other objects, advantages, and applications of the present invention will be made apparent by the following detailed description of a preferred embodiment of the invention. The description makes reference to the accompanying drawings in which:

FIG. 2 is a top, plan view of the machine;

FIG. 3 is a bottom view of the machine;

FIG. 4 is a side view of the machine;

FIG. 5 is an elevation sectional view of the machine taken along lines 5—5 of FIG. 2;

FIG. 6 is an elevation sectional view of the machine taken along lines 6—6 of FIG. 7;

FIG. 7 is an elevation sectional view of the machine taken along lines 7—7 of FIG. 2;

FIG. 8 is an elevation sectional view of the machine taken along lines 8—8 of FIG. 2;

FIG. 9 is a detailed elevational view of the composing stick of the present invention;

FIG. 10 is a detailed view of the aperture system used with the present invention;

FIG. 11 is a detailed plan view of the composing stick of the present invention;

FIG. 12 is a sectional view of the composing stick taken along lines 12—12 of FIG. 9;

FIG. 13 is a sectional view of the composing stick taken along lines 13—13 of FIG. 9;

FIGS. 14, 15, 16 and 17 are detailed views of the various sides of type block which may be used in connection with the present invention.

Figure 1:
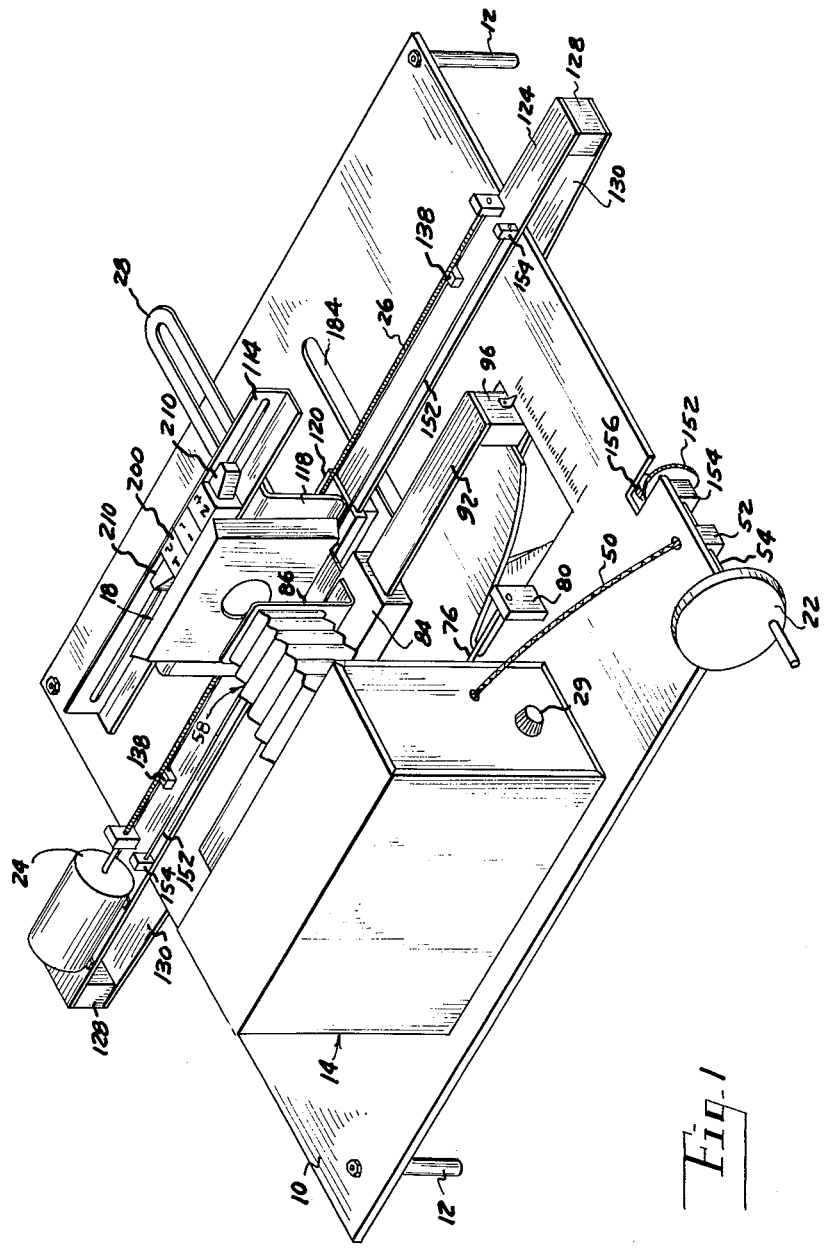
FIG. 1 is a perspective view of a machine constituting a preferred embodiment of my invention.

The general relationship of the major assemblies of the machine is best seen in FIGS. 1 and 4. These assemblies are arranged about a base 10 formed from a plate and raised above a supporting surface by four legs 12 disposed at its corners. The major assemblies of the invention are a film box generally indicated at 14, a lens support generally indicated at 16, a light box generally indicated at 18, and a copy support generally indicated at 20. In the following description, the axis of the plate which extends between the film box 14 and the copy support 20 will be considered the longitudinal axis of the machine while the direction perpendicular to that will be termed the transverse axis.

The film box 14 is at all times fixed with respect to the base 10 of the machine while the lens support 16, light box 18, and copy support 20 are all capable of movement along both the longitudinal and transverse axes. Their motions may be divided into two classes. During the adjustment of degree of enlargement or reduction, the lens support 16, light box 18, copy support 20, all move longitudinally with respect to one another so as to properly focus an image of the correct size on the film contained within the box 14. During this longitudinal motion, the light box 18 moves with the copy support 20 while the lens support 16 is moved through distance that is a nonlinear function of movement of the other two units. These longitudinal motions are manually powered through a hand wheel 22 in a manner which will subsequently be described.

Figure 18:
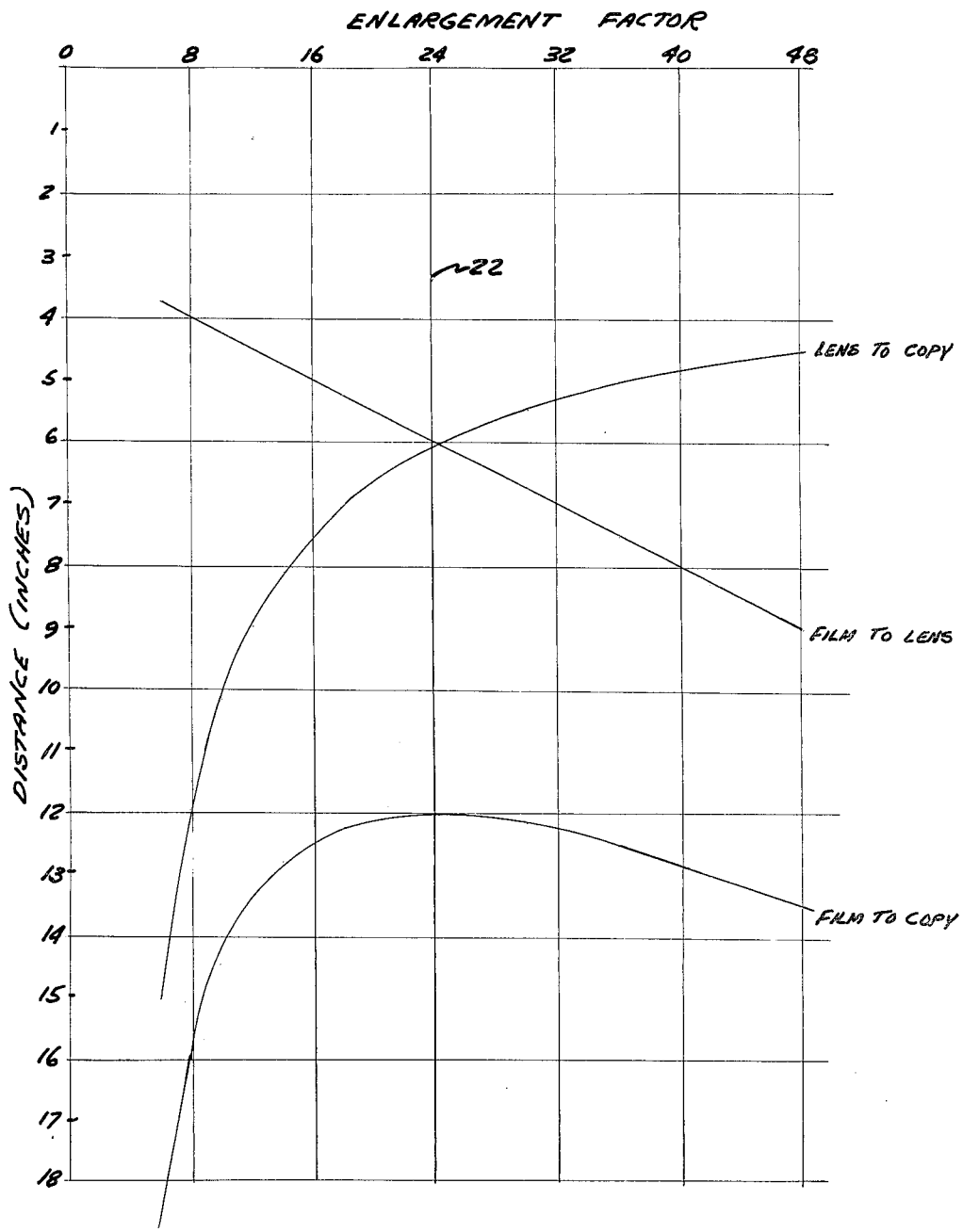
FIG. 18 is a graph illustrating the positional relationships that exist between the film, lens, and copy for various enlargement ratios.

FIG. 18 is a graph illustrating the positional relationships which exist between the film, lens, and copy for various degrees of enlargement or reduction. The abscissa is distance while the ordinates are a size of the resultant image on the film. Line 22 indicates the relationship necessary to obtain an image of the same to obtain an image of the same size as the copy. The lines above 22 indicate an enlargement while the lines below 22 indicate a reduction. The graph is based on the formula 1/A plus 1/B equals 1/F where A is the distance from the film to the lens, B is the distance from the lens to the copy, and F is the focal length of the lens. The abscissa is the distance in millimeters while the ordinates are in points, a measure of type size. It will be noted that if the lens is moved at a linear rate with respect to the film, the copy must be moved through a distance in any direction which is dependent upon the degree of enlargement or reduction that is desired to be obtained.

The second class of movement occurs when a line of copy is exposed to a section of film contained in box 14. During this exposure, the copy support 20 and the light box 18 move transversely across the base 10 and the lens support 16 moves in the same direction but at a different rate. The transverse motions are powered by an electric motor 24 that drives the copy support through a screw 26. A slotted bar 28 is pivoted with respect to the base at a point 30 and transmits the transverse motion of the copy support 20 to the lens support 16.

In order to expose the film to one line of copy, the lens must sweep from one edge of the film to the opposite film while the copy is simultaneously swept past the lens. For various degrees of enlargement or contraction, the length of a line to be exposed on the film is accordingly varied. The slotted bar 28 varies the width of film that is exposed automatically in accordance with the longitudinal relationship of the film, copy, and lens and thus in accordance with the enlargement-reduction ratio.

*Film box*

The film is retained in box 14 on a pair of horizontal rolls 25 and 27. The film is initially loaded on the roll 25, and the roll 27 acts as a takeup. A knob 29 extends out of one side of the box and turns the roll 27 so as to move the film. The film passes over three horizontal rolls 31, 32 and 34 so that a linear section of film 36 is parallel to a set of aperture plates 38 and 40.

The aperture plates 38 and 40 are disposed parallel to one another and overlap at a pair of V-shaped cutouts 42 which mate so as to form a square hole between the two plates. Each of the plates 38 and 40 has an attached nut 44 which mates with the threads of a screw 46 so as to move the plates toward or away from one another as the screw is rotated in such a manner as to enlarge or contract the square formed by the cutouts 42. The screw 46 has threads of opposed hand in each of its ends so as to achieve the opposed motions of the plates 38 and 40 upon rotation. A gear box 48 drives the screw and is connected by a flexible shaft 50, which passes through a hole in the wall of the film box 14, to a drive box 52 that is formed about a shaft 54.

The shaft 54 is powered by the same hand wheel 22 that adjusts the longitudinal positions of the lens support 16 and the copy support 20. Thus the same powering which adjusts the enlargement-reduction ratio of the device changes the size of the aperture formed by the plates 38 and 40 and thereby exposes a different height of film on a section 36 to the copy.

As will subsequently be detailed, the transverse speed of the lens support mechanism 16 varies as does the enlargement ratio. The change in aperture width that automatically occurs with a change in enlargement ratio insures that a film segment will be exposed for a constant length of time, independent of lens speed since the aperture width increases as the lens speed increases.

The knob 29 is rotated between exposures so as to bring successive vertical lines of film into exposure position. Means might also be provided for advancing the preset amount of film upon each rotation of the knob 29.

The film box 14 has a longitudinal rectangular slot 56 extending across its face which is adjacent to the lens support 16. A bellows 58 extends across the height of the slot and has a pair of curtains 60 and 62 atttached to its two side edges. These curtains cover the remaining width of the aperture and bear against vertical rollers 64 and 66 arranged at the extreme edges of the aperture. The curtains 60 and 62 are then wound around rollers 68 and 70 by means of constant-tension springs which take up any slack. As the bellows 58 is moved across the width of the slot, in a manner which will subsequently be described, the curtain 60 and 62 wind and unwind about their rollers 68 and 70 and act to cover all of the slot 56 except that portion occupied by the bellows 58.

An image projected through the section of the slot 56 is focused by an inclined first surface mirror 72 onto the film section 36. The mirror 72 is of sufficient length to reflect the image received through the slot 56 to the aperture in the plates 38 and 40. Both the mirror 72 and the aperture system are supported in a housing 74 which attaches to the edge of the bellows system 58 and passes through the upper and lower edges of the slot 56. In this manner, both the mirror and the aperture move transversely with the bellows across the width of the film.

*Lens support*

The end of the bellows 58 which is adjacent to the film box 14 is supported for transverse movement along a rod 76 which is supported above the plate near the base 10 by a pair of blocks 78 and 80. A traveller 82 attached to the lower end of the bellows 58 has a central hole which surrounds the rod 76.

A bellows framing member 81 is attached to the traveller 82 and extends longitudinally. Its other end passes through a slot 83 in a lens support block 84. This block carries a vertical plate 86 which supports the lens 90 at the forward end of bellows 58. The member 81 moves in a longitudinal slot in the lens support block 84 in such a manner that the transverse motion of the lens support block is transmitted through the plate to the film end of the bellows, but the longitudinal motion of the block causes the member 81 to slide through the slot and effects an extension or folding of the bellows and an adjustment of the position of the lens 90 with respect to the film box 14.

The support block 84 also has a transverse slot through which passes a lens support slide plate 92. This plate extends across a distance slightly greater than the width of the film box 14. Its opposite ends are supported by blocks 94 and 96 which pass through curved slots 98 and 100 in the base 10. The lower ends of the blocks 94 and 96 are attached to a wing shaped plate 102 which lies parallel to the base 10 on its lower side.

As is best seen in Fig. 3, the plate 102 is symmetrical about a longitudinal centerline and has a pair of rear wings 104 which lie in the direction of the film box 14 and a pair of forward wings 106 which lie in the direction of the copy support bar 20. The transverse ends of the rear wings 104 lie under a pair of longitudinally aligned slideways 108 which are attached to the underside of the base 10. While the forward wings 106 may move longitudinally in a similar pair of ways 110 attached to the underside of the forward part of the base 10. These ways 108 and 110 allow the plate 102 to move in a longitudinal direction. This motion is transmitted through the blocks 94 and 96 to the transverse lens slide plate 92. The mechanism for causing the plate to move longitudinally is powered through the hand wheel 22 and will subsequently be described under the heading "Enlargement Focus-Longitudinal Movement". The transverse motion of the support block 84 across its slide plate 92 is powered by the slotted bar 28 off of the transverse motion of the copy support bar 20 in a manner which will also be subsequently described in detail. The center slot in the bar 28 surrounds a pin 112 which depends from the lower side of the lens support block 84. As the right-hand end of the bar, as viewed in Fig 6, pivots with the copy support, the lens mount assembly is caused to move transversely.

Copy bar support

The copy bar support, generally indicated at 20, comprises means for moving a copy bar 114 transversely during the film exposure cycle and longitudinally during the enlargement focusing operation. The copy bar 114 will be subsequently described in greater detail. It is supported in a right-angle bent section 116 of a vertically extending support bracket 118. The bent section 116 is set at approximately the same height above the base 10 as the center of the lens 90 and the slot 56 in the film box 14. The lower end of the bracket 118 is fixed to the top of a pair of plates 120 and 122 which bear against the upper and lower faces of a transversely extending copy slide bar 124. The ends of the plates 120 and 122 are joined by bars 126 so as to completely encompass the upper slide 124. The ends of the upper slide 124 extend beyond the edges of the base 10 and connect to blocks 128 which have their undersides attached to the extreme ends of a lower copy slide 130.

The lower slide 130 extends entirely across the base 10 and is supported on the upper side of the ways 110. The motion of both the upper and lower copy slides 124 and 130 is restrained to the longitudinal by a pair of guides 132 which extend upwardly from the center of the lower copy slide 130 and move in a longitudinal slot 134.

The bracket 118 and the copy bar 114 are moved transversely across the upper slide 124 under the power of the motor 24 as transmitted through its lead screw 26. The lead screw passes through a nut block 136 which is attached to the upper side the plate 120 forward of the bracket 118. A pair of limit switches 138 are disposed along the slide bar 124 at points which are appropriate to the extremes of motion of the nut block 136. The transverse motion of the copy support 20 is powered by the motor 24 from the point adjacent one of the limit switches 138 to the other limit switch 138. The limit switches act to terminate the rotation of the motor 24 upon being abutted by the nut block 136.

This transverse motion of the copy bar is transmitted to the slotted bar 28 and thus to the lens support 16 through a cam roller 140 which depends from the underside of the plate 122. The cam roller 140 is rotatable about a vertical axis and passes through the center of the slot of the bar 28. The bar 28 is thus caused to pivot about its hinge point 30 and the lens 14 is moved through a transverse distance that is appropriate to its separation from the film box 14.

Light box

The light reflector 18 must move longitudinally with the copy support 20 during an enlargement focusing motion so that it is immediately adjacent to the copy which it illuminates. It must also move transversely with the lens support 16 during an exposure of a section of film so that it is always illuminating that portion of the copy which is being exposed to the lens.

The reflector 18 is dish shaped, with its opening facing toward the copy support 20. It contains a plurality of light bulbs 141 arranged about a central circular hole 142 in the reflector. This hole is formed at the same height above the base 10 as is the lens 90, the copy bar 114, and the slot 56 in the film box 14. It allows the lens 90 to be focused on a portion of the type supported in the copy bar 114. The lights and the reflector 18 are so arranged as to project a maximum intensity of light on the item of copy which is in focus on the film.

The reflector 18 is supported vertically at its lower end by a horizontal bar 144 which extends longitudinally away from the reflector toward the film box 14, passes through a longitudinal slot in the lens support block 84, and has its end disposed in a longitudinal slot in the block 78. The end of the bar 144 immediaely below the reflector 18 has a pair of downwardly depending lugs 150, which pass over the sides of a transverse bar 152 that extends along the copy slide bar 124 and is supported at its ends by blocks 154 fixed to the upper sides of the copy slide 124.

When the copy bar 20 undergoes a longitudinal motion during the enlargement focusing setup, the bar 152 moves against the lugs 150 to slide the reflector 18 along with the copy support 20. During this motion, the reflector bar 144 slides through the slots 146 and 148 in the blocks 84 and 78. When the lens support and the copy bar move transversely during the exposure of a section of copy, the reflector 18 slides transversely along the bar 152 with the motion of the lens support block 84, so as to continually illuminates that section of the copy which is under the scrutiny of the lens.

Enlargement focus-longitudinal movement

As has been noted in connection with FIG. 18, the longitudinal motions which the lens and the copy undergo during a change in the enlargement ratio, in order to maintain focus, are not linear with respect to one another. In the preferred embodiment of the invention, means has been provided to move the lens at a linear rate with respect to the powering movement and to cause the copy to simultaneously undergo a nonlinear position adjustment. While this particular form of auto-focusing motion is novel, other more conventional, autofocusing techniques might be used in connection with the present invention.

The longitudinal focusing motion is powered by the hand wheel 22 which carries a bevel gear 153 at the end of its shaft 54. The shaft 54 is supported on the underside of the base 10 in a pair of journal blocks 154. The bevel gear 153 mates with a smaller pinion 156, driving a transversely extending screw 158 which is supported in a pair of journal blocks 160 fixed to the lower side of the base 10.

The screw 158 has threads of opposite hands along its two halves, the opposing threads meeting at the center of the screw 158. A pair of nuts 162 and 164 operate on the two halves of the screw. As may best be seen in FIG. 8, the nuts 162 and 164 each have projections 166 and 168 which extend from their upper sides and pass through slots in the ends of a pair of crossbars 170 and 172. The projections 166 and 168 also pass through a pair of slots 174 in the rear wings 104 of slide plate 102. The crossed bars 170 and 172 are elongated and have central axial slots adjacent to their ends. Near their midpoints they are pivoted about a center 176 which is fixed in the middle of the forward wings 106 of the plate 102. The top end of the center projects upwardly through the longitudinal slot 134 in the base 10.

A washer 178 is disposed between the crossbar 172 and the wing 104 about the projection 166 and another washer 180 is disposed between the nut 164 and the crossbar 170, in order to maintain the crossbars 170 and 172 in parallel relationship to the base 10. The forward slots in the crossed bars 170 and 172 journal a pair of projections 181 and 182 which are fixed to the underside of the lower copy bar slide 130. The upper ends of these projections 181 and 182 are fitted in longitudinal slots 184 and 186 in the base 10 which act as guides to both the bars and the slide 130.

In the drawings the apparatus is illustrated in a position of minimum enlargement, wherein the lens support 16 and the copy bar 20 are at their farthest positions from the film box 14. As the hand wheel 22 is rotated from this position, its rotation is transmitted through the shaft 54 to the screw 158 causing the nuts 162 and 164 to move toward one another and the longitudinal axis of the assembly. The projections 166 and 168 on the nuts 162 and 164, moving in the slots 174 and the plate 102, cause the plate, along with the lens support slide, to move in the direction of the film box 14. This motion is a linear one producing a constant motion of the lens support assembly 16 for a given rotation of the hand wheel 22.

The motion of the plate 102 moves the center of rotation 176 of the crossed bars 170 and 172. But simultaneously, the bars are being rotated about their center point 176 because of the motions of the nuts 162 and 164. The combined movement of the bars produces a motion of the copy support slides 126 and 130 in the longitudinal direction. This motion is nonlinear with respect to the motion of the plate 102 and the lens support assembly. FIG. 18 graphically discloses the motion that the particular geometry provides. It is to be understood that an equivalent motion may be provided for other focal length. Because of the particular geometry utilized in the auto-focusing system, the motion of the slide 126 may be in the opposite direction to the motion of the lens support assembly 16 at any given moment.

Copy bar

The phototype used in connection with the present invention takes the form of rectangular phototype blocks 200 having two square faces. The other four faces are rectangular, and each contains a pair of characters which are inverted with respect to one another. Thus eight characters are contained on any one type block and it is preferred that such eight characters all represent the same symbol in eight different type faces, all of either upper or lower case. The width of the type bearing faces of the blocks 200 will thus vary as do the normal widths of the characters they bear. In order to effectively use this system, eight type faces having the same width for each character must be available.

FIGS. 14, 15, 16 and 17 illustrate the four faces of a single block of phototype 200 which carries the symbol n in eight different type faces. Two of these characters appear on each face and they are inverted with respect to one another so that the uppermost of the two characters reads correctly.

The phototype blocks 200 are assembled with their square faces abutting one another in such an orientation that similar type faces are adjacent to one another. As illustrated in FIGS. 9 and 10, wherein the word TIN is formed, it will be noted that when the blocks are properly assembled the word may be viewed in any of the eight type faces by rotating the assembled blocks simultaneously to a proper position.

The composing stick 114 has an elongated slot 202 running along its back which mates with a similar slot 204 in the back of the bracket section 116. A pair of end pieces 206 are slidable along the slots by means of screws 208 which extend from their backs and nuts 210 which allow them to be tightened against the slots in any particular position. Screws 212 and lock nuts 214 enable the composing stick to be securely maintained in the bracket. The height of the type in the composing stick is such that only the uppermost of the two characters formed on the face of a particular block will be in focus on the film. To bring the lower type grouping on a set of blocks into focus, the block must be inverted through 180 degrees. This type system allows one set of type to provide eight different type styles.

Operation

The machine is first adjusted to a particular enlargement ratio by rotating the hand wheel 22. The block 96 on the lens support slide plate 92 carries a pointer 220 which aligns with a set of indicia spaced in a longitudinal line along the base 10. The position of the pointer 220 along the indicia 222 indicates the size of the image on the film, in points, for a given point-size type used in connection with the hopy holder.

Following the setting of the enlargement ratio, the first line of type is assembled in a composing stick and inserted in the copy holder bracket section 116. The knob 29 on the film box 14 is then rotated to bring a section of film into registry with the apertures in the plates 38 and 40. These apertures have been adjusted to a proper size by the rotation of the hand wheel 22 as transmitted through the drive box 52 and the flexible shaft 50.

At the beginning of the exposure cycle, the lens support 16 and the copy bar 20 are disposed at one extreme position of their transverse travel. Upon the actuation of the electrical circuitry (not shown) which may be of any variety known to the art, electric motor 24 is actuated and its screw is rotated so as to move the copy support 20 transversely across its slide bar 124. This motion continues until the bar abuts the limit switch 138 at the extreme end of its travel, deactuating the electric motor. This transverse motion of the copy holder has been transmitted through the slotted bar 28 to the lens support 16. It thereby undergoes a transverse motion of reduced length during which it exposes a width of film which is appropriate to the particular enlargement ratio selected. During these transverse motions, the copy will have been swept past the lens as the lens is swept across the film. Any exposure of the film beyond the limits of the types set in the composing stick will result in a blank image on the film.

Following the exposure of a single line, the type in the composing stick is changed and the electrical circuit is then actuated to cause a transverse movement of the copy and the lens in the return direction, exposing the next section of film which has been rolled into position with the knob 29. This process is continued until the entire section of the desired copy is completed.

Having thus described my invention, I claim:

1. A machine of the type described, comprising: a bar operative to support copy which has an extension along an axis; a lens supported on a point separated from said axis; light-sensitive film having an extension in a direction parallel to said axis disposed at a point displaced from said axis in the same direction as said lens and at a greater distance from said axis than said lens; means for adjusting the spacing between the copy, the lens and the film in such a maner that the copy bar is continually focused at the film by the lens; means operative to constrain any two of the copy bar, lens and film for motion parallel to said axis; and a drive bar privotably supported at whichever of the copy bar, lens and film is not moveable parallel to the axis and slidably connected to the two members which are moveable parallel to the axis so that as said drive bar is pivoted about its point of support it moves the other two elements parallel to the axis at rates proportional to their distances from the non-moveable element.

2. The structure of claim 1 which includes a motor, drivingly connected to said drive bar so as to cause said drive bar to pivot about its axis at such a rate as to move the two moveable elements at constant speeds.

3. A machine of the type described, comprising: light-sensitive film having an extension along a first axis; a lens constrained to movement in a direction parallel to said first axis; a bar operative to support copy constrained to movement in a direction parallel to said first axis, said film, lens and bar lying in the same plane with the lens between the film and the bar; a drive bar pivotably supported at the film and slidably connected to the lens and copy bar; and means for pivoting the drive bar about its point of support so as to move the lens and copy bar parallel to the film at constant rates proportional to their distances from the film.

4. The machine of claim 3 wherein the means for pivoting the drive bar about its point of support so as to move the lens and copy bar parallel to the film at constant rates proportional to their distances from the film includes a motor, and a drive element powered by the motor so as to cause it to move in a direction parallel to said first axis at a constant rate, said drive element being slidably connected to the drive bar at a point separated from its point of support.

5. The machine of claim 3 wherein the means for pivoting the drive bar about its point of support so as to move the lens and copy bar parallel to the film at constant rates proportional to their distances from the film consists of a motor, a screw driven by the motor and extending parallel to said first axis, and a nut in mesh with said screw, and slidably connected to said drive bar at a point separated from its point of support.

References Cited by the Examiner
UNITED STATES PATENTS

| | | | |
|---|---|---|---|
| 791,062 | 5/1905 | Wetmore | 95—4.5 X |
| 1,613,204 | 1/1927 | Smith | 35—71 |
| 1,986,693 | 1/1935 | Uher | 95—4.5 |
| 2,153,186 | 4/1939 | Henderson | 88—24 |
| 2,158,039 | 5/1939 | Wenczler | 95—4.5 |
| 2,313,119 | 3/1943 | Brand | 95—4.5 |
| 2,572,322 | 10/1951 | De Goeij | 95—85 X |
| 2,983,427 | 5/1960 | Alves | 88—24 |

JOHN M. HORAN, *Primary Examiner.*

NORTON ANSHER, *Examiner.*